Feb. 14, 1961  P. J. WEAVER  2,971,535
MACHINE TOOL CONTROL
Filed Nov. 17, 1958
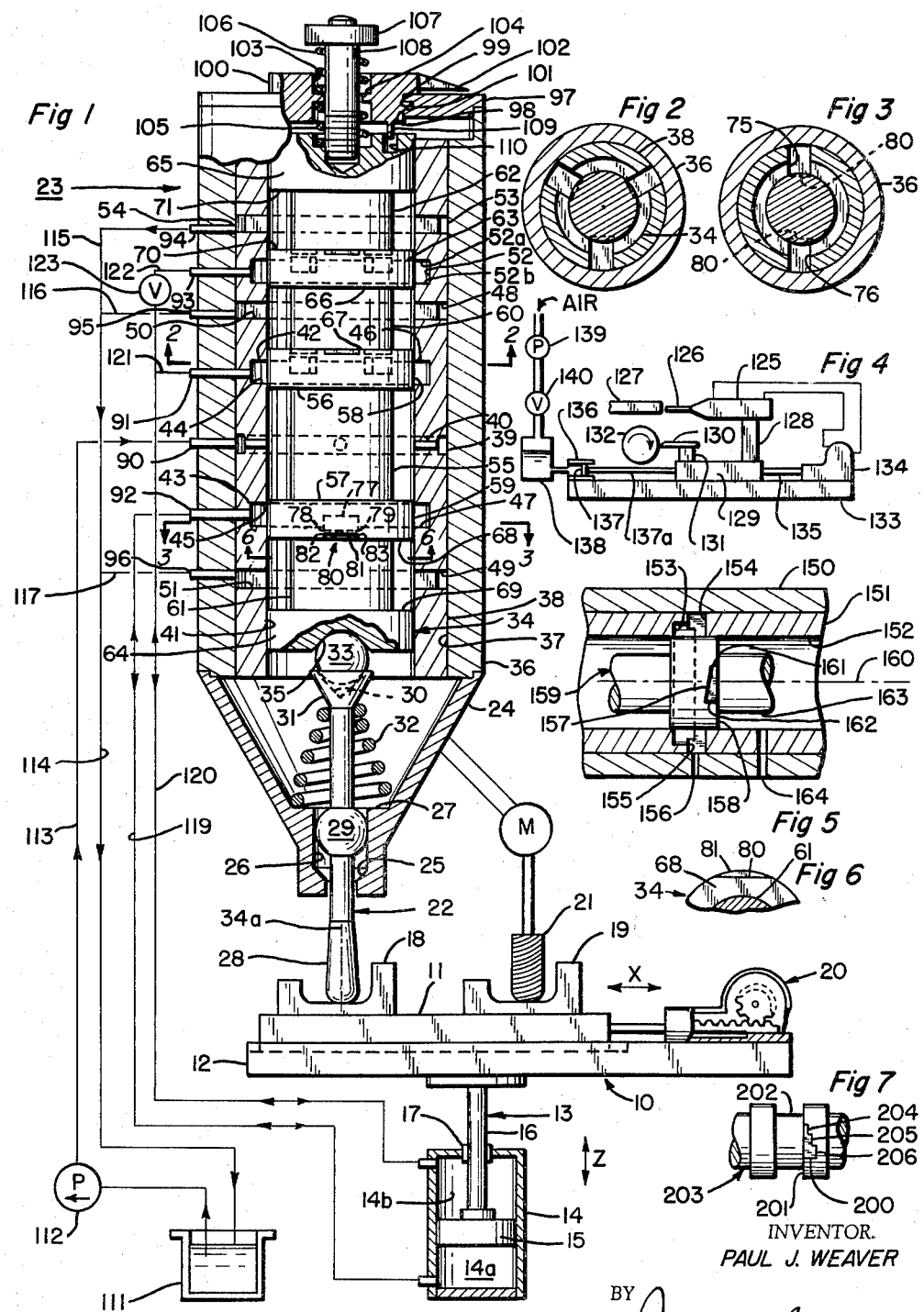
INVENTOR.
PAUL J. WEAVER
BY
Argus & Mon
ATTORNEYS.

United States Patent Office 2,971,535
Patented Feb. 14, 1961

2,971,535

MACHINE TOOL CONTROL

Paul J. Weaver, Downey, Calif., assignor, by mesne assignments, to Banstrom Industries, Inc., Los Angeles, Calif., a corporation of Connecticut Filed Nov. 17, 1958, Ser. No. 774,523

7 Claims. (Cl. 137—620)

This invention relates to contour copying machine tools, and to control valves and control systems for such tools.

In the cutting of contours with copying machines such as die sinkers, lathe tracers, mills, and the like, it is desirable to exercise close control over the rate of machine tool movement in both directions along an axis. It is also desirable to be able to adjust the rate within a wide range of speeds which range includes very slow rates, and comparatively much greater rates. A further desirable feature is to provide means for regulating the device so that the speed in both directions of movement is the same for a given amount of valve actuation. This is particularly useful when the movable machine tool member has a biased tendency to move in one of its directions of movement.

The above objectives are not simple to attain, and the art in this field includes many highly sophisticated machines which seek to approach them. In particular, the attempt to get a wide range of machine rates from a single valve control has been the subject of many improvements, but such improvements have customarily included numerous attachments and complexities for compensating errors inherent in the controls. The result has been an increasing complexity in the art, until the law of diminishing returns has taken over, with each improvement costing more to correct an increasingly smaller troublesome effect. It is an object of this invention to take a completely new approach, and to correct prior inadequacies with a completely new control valve concept that is simplicity itself.

This invention is adapted to be carried out in combination with a contour copying machine tool which has at least one element which is relatively reciprocable in both directions along an axis. A characteristic of many installations of this type is that the machine tool element is biased in one of these directions. An example is a mill that has a vertically reciprocable work table wherein the weight of the table is supported by a knee cylinder or some other type of fluid motor. The downward force in the motor is greater than the upward force by an increment equal to the weight of the table. Of course, this downward force must be overcome in order to move the machine upward. Another familiar example is found in a biasing system by means of which the backlash in a gear train is taken up by biasing the element in one of the directions, and requiring this bias force to be overcome in order to move the element.

It will be seen that the force required to move this element in the direction against the bias or supported weight than in the other is greater by the amount of the bias force. Persons familiar with hydraulic laws will recognize at once that the flow characteristics to either side of the motor carrying out this movement must be different if the rates of movement in both directions for a unit opening of the valve are to be equal. This is because a valve that is opened so as to provide the same area of flow orifice will pass a different volume of fluid per unit time when the pressures differ. This causes the machine tool element to move at a different rate of speed in one direction than in the other. A difference in rates tends to spoil the dimensional tolerances of parts produced on a contour copying tool.

According to this invention a tracer valve, which is adapted to be actuated by contact with a pattern or template to be duplicated in a workpiece is provided with a sleeve and with a spool adapted to reciprocate in the sleeve. The sleeve and the spool are provided with staggered recesses which provide fluid conduits through the valve when the spool is displaced in one direction or the other from a neutral position.

Some of these recesses are connected to a motor which is intended to drive the machine tool element, while others are connected to a source of fluid under pressure and to an exhaust. These recesses intersect with the walls of the sleeve and the spool to form restrictions. The size of the restrictions varies with the orientation of the spool relative to the sleeve.

A feature of this invention resides in providing the sleeve with depressions in communication with the sleeve recesses and the spool with hollows in communication with the spool recesses. When in registration, the depressions and hollows form flow passages which extend around less than the entire periphery of the sleeve and spool respectively. The size of the orifice in these passages is a function of both the amount of axial overlap and also the radial overlap of the depressions and hollows. The axial overlap is determined by the displacement of the spool in the sleeve caused by a stylus which engages the template or pattern to be copied, and the amount of rotational overlap is adjusted by turning the spool relative to the sleeve.

A feature of this invention resides in providing more of said depressions and hollows at the control edges which face the unbiased side of the fluid motor than on the other, thereby providing a greater total flow orifice on the lower-pressure side of the control valve that permits a volume of fluid to pass at a lower pressure when moving in one direction, which is equal to the volume passed at a higher pressure when moving in the other direction.

A related but optional feature of the invention resides in providing the recesses as continuous circumferential grooves which extend entirely around the sleeve and the spool, and forming the depressions and hollows as advanced notches which are in fluid communication with said recesses, and so disposing the relative parts that, after a sufficient axial movement of the spool, not only are the depressions and hollows in fluid communication, but also the recesses themselves are in substantial fluid communication even apart from the flow section through the depressions and hollows.

Another related but optional feature of the invention resides in providing a greater number of recesses which are connectible with the said unbiased side of the motor, said recesses being adapted to be placed in parallel connection with the respective recesses to provide for a greater flow orifice area through this side of the valve.

The above and other features of this invention will be fully understood from the following detailed description and the accompanying drawings, of which:

Fig. 1 is a side elevation, partly in cutaway cross-section, of a machine tool incorporating a valve according to the invention;

Figs. 2 and 3 are cross-sections taken at lines 2—2 and 3—3, respectively, of Fig. 1;

Fig. 4 is a side elevation, partly in cross-section and partly in schematic notation, showing another embodiment of the invention;

Fig. 5 is a side view, partly in cutaway cross-section, of an alternate embodiment of a portion of a valve according to the invention;

Fig. 6 is a fragmentary cross-section taken at line 6—6 of Fig. 1; and

Fig. 7 is a fragmentary elevation of another form of spool useful in the invention.

In Fig. 1 a milling machine 10 is shown with a control system according to this invention, connected thereto. The milling machine includes a work table 11 which is reciprocable on horizontal ways 12. The table moves relative to the ways along an axis marked "X" in the drawings. The ways are supported on a knee 13 so that the table can be reciprocated vertically along an axis marked "Z" in the drawings.

The knee 13 includes a knee cylinder 14 which rests upon a foundation and which encloses a piston 15. To the piston there is attached a rod 16 which passes through a gland 17 at the upper end of the cylinder. The cylinder and piston assembly comprise a fluid motor which drives the work table along the "Z" axis.

The part of cylinder 14 below the piston, numbered 14a, in which fluid pressure is partly caused by the weight of the table, is called the "biased" side of the motor. Part 14b above the piston, in which the pressure is lesser, is called the "unbiased" side.

A pattern 18 (sometimes called a "template") and a workpiece 19 are mounted to the work table in spaced relationship.

A fluid motor 20, which is preferably of the meshed-gear class, is mounted to the ways and is drivingly connected to the work table. Fluid motor 20 drives the work table along the "X" axis.

The motors are each provided with a pair of motor ports for receiving working fluid. Depending on the direction of operation of the motor, either one of the motor ports will be an inlet, and the other will be an outlet. The choice is reversed to change the direction of operation.

The two fluid motors, by appropriate operation, can shift the work table, pattern, and workpiece in unison anywhere in the "X—Z" plane (which is the plane of Fig. 1) within the limits of the device. It is the object of this invention to provide a tracer valve for scanning the pattern and causing the knee to move the work table along the "Z" axis. Fluid motor 20 may be separately controlled for governing movement along the "X" axis. The control of fluid motor 20 forms no part of this invention. A somewhat similar control system, in which a single tracer valve provides for control of movements in both the "X" and "Z" axis may be found in applicant's co-pending patent application, Serial No. 748,426, filed July 14, 1958, entitled "Pattern Controlled Machine Tool."

The object of motion as controlled by the tracer valve of this invention is to cause the pattern to be scanned and to move the work table in the plane of Fig. 1 so that a cutter 21 will mill the contour of the pattern into the workpiece. This scanning is accomplished by the tracing movement of a stylus 22 that is mounted to a tracer valve along the surface of the pattern. The tracing movement of the stylus operates valve components in the tracer valve, and thereby regulates the operation of the knee to move the table up and down so that the pattern and workpiece maintain correlated positions between the stylus and cutter, respectively, along the "Z" axis. When fluid motor 20 is operated to shift the work table along the "X" axis, this relative movement in the "Z" axis will cause the shape of the pattern to be duplicated in the workpiece.

Control valve 23 has a conical nose housing 24 with an interior conical seat 25 near the lower end of a stylus passage 26. Adjacent to the upper end of the stylus passage 26 there is a spring-retaining shoulder 27. The stylus 22 passes through the stylus passage, and has a pendular portion 28 extending beyond the nose housing.

A ball-like mounting member 29 is incorporated in the stylus at an intermediate portion thereof. The outer contour of member 29 is generally spherical. The mounting member is reciprocable in the stylus passage along the "Z" axis, and its lowermost position is defined by seat 25, which restrains it from further downward movement.

At its upper end the stylus has a conical seat 30, the seat preferably having a 90° included angle. The outer portion of the upper end of the stylus is tapered at 31. A counterbalance spring 32 is disposed between tapered portion 31 and spring-retaining shoulder 27 for centering the stylus and for counteracting the weight of certain valve elements which rest upon the stylus from above.

A ball 33 rests in seat 30 and supports a spool 34. Spool 34 has a central axis 34a, which is also the central axis of the entire valve. The lower end of the spool has, as shown in Fig. 1, a conical seat 35 with an included conical angle which preferably matches that of the conical seat 30 in the stylus, in this case 90°.

It will be seen that either lifting or tilting the stylus causes the spool to move in an upward direction, while a downward movement of the stylus lets the spool move downward.

The nose housing 24 is attached to an outer housing 36. The outer housing surrounds the valve mechanism so as to close it up. It permits the valve to be manufactured in the simple and expeditious manner to be described. Fluid connections through the outer housing 36 will be described after the remainder of the valve components have been described, because it is the purpose of these connections to enable the inside valve mechanism to be connected up to external hydraulic devices.

The outer housing 36 has an axial bore 37 passing therethrough. A valve sleeve 38 is pressed into this bore. The valve sleeve, along with spool 34 forms a spool valve which in response to actuation by the stylus controls the relative movement of the workpiece and the cutter along the "Z" axis.

The sleeve has an exterior pressure groove 39 with four pressure inlet ports 40 interconnecting groove 39 with the wall of a spool passage 41 which passes axially through the sleeve. Inlet ports 40 thereby are adapted to provide fluid under pressure to the spool passage. On both sides of the pressure inlet ports, and spaced therefrom, there are motor supply grooves 42 and 43 sunk into the wall of the spool passage. These motor supply grooves extend circumferentially around the spool passage. They are bounded on their sides closer to the pressure inlet ports by continuous circular shoulders 44 and 45, respectively, and on their sides away from the pressure inlet port by shoulders 46 and 47 which are modified by "notches" in a manner to be discussed more fully below.

Exterior exhaust grooves 48, 49 are sunk in the outer wall of the sleeve on the opposite side of the motor supply grooves from the pressure inlet ports. They are connected to the spool passage by exhaust ports 50, 51, respectively. Above the upper exhaust port 50 there is placed still another motor supply groove 52. This motor supply groove is identical with motor supply groove 42, and is bounded by shoulders 52a and 52b, respectively.

In the motor supply grooves, the shoulder closer to the pressure port is circular (shoulder 44, 45 and 52b), and the one farther from the pressure port is modified by "notches" (shoulders 46, 47 and 52a). Above motor supply groove 52 in Fig. 1 there is disposed another exterior exhaust groove 53 which communicates with the spool passage through exhaust ports 54.

Spool 34 is provided with a pressure groove 55 which stands opposite the pressure inlet port 40. Pressure groove 55 is bounded by a pair of annular shoulders 56, 57 at the edge of lands 58, 59, respectively. Shoulders 56 and 57 are adapted to co-act as fluid restrictions with shoulders 44 and 45 of motor supply grooves 42 and 43, respectively.

An exhaust groove 60, 61 is provided on the side of lands 58 and 59, respectively, removed from the pressure groove. Still another exhaust groove 62 is sunk in the spool on the other side of exhaust groove 60 away from land 58. Exhaust grooves 60, 61 and 62 are respectively in communication with exhaust ports 50, 51 and 54.

Exhaust groove 60 is bounded by land 58 and by a second land 63. Exhaust groove 61 is bounded by land 59 and another land 64. Exhaust groove 62 is bounded by land 63 and another land 65.

It will be observerd that the raised portions (lands) on the spool make a close, fluid-sealing contact with the raised portions of the wall (sleeve lands) of the sleeve lands. Both the spool passage and the spool lands are generally circularly cylindrical in shape. The spool can therefore be rotated and axially shifted within the sleeve.

Exhaust groove 60 is bounded at its upper edge by a shoulder 66, which is a continuous circular shoulder, and the groove is bounded at its lower edge by a shoulder 67 which is modified by "notches" in a manner to be discussed below. Similarly, exhaust groove 61 is bounded on its side closer to the motor supply groove by a shoulder 68 which is generally circular, but modified by "notches," and at its other end by a shoulder 69, which is a continuous circle. Exhaust groove 62 is bounded at its edge closer to motor supply port 52 by a shoulder 70 which is modified by "notches," and on its side farther from the motor supply groove by a shoulder 71, which is a continuous circular shoulder.

It has been stated above that shoulders 67, 68 and 70 on the spool and shoulders 46, 47 and 52a on the sleeve, are modified by "notches." These notches will now be described, with particular reference to Figs. 1 and 3. Only one set of notched shoulders will be discussed in detail, it being understood that the remaining shoulders are similar and have like properties.

Particular reference will now be made to shoulder 47 on the sleeve and shoulder 68 on the spool. It will be observed that these shoulders are disposed to form a restriction to fluid flow between motor supply groove 43 in the sleeve and exhaust groove 61 in the spool. Fluid communication past these shoulders is possible when the spool valve is moved in an upward direction in Fig. 1, so that some part of these shoulders has overlapped the other and leaves an opening therebetween. When the spool is at the neutral position, shown in Fig. 1, or drops downward, then the two shoulders do not overlap. Instead, the adjacent lands overlap, and there is no fluid communication between the grooves.

Sleeve 38 is pierced by a pair of diametrically opposed rectangular passages which form notches in edge 47 that are referred to as "depressions." Depressions 75 and 76 are shown in Fig. 3. These depressions are closed off by the outer housing 36 of the device and are intended only for "advancing" shoulder 47 axially for a purpose to be described below.

It will be noted in Fig. 1 that edge 47 is thereby modified by a triple-segmented depression, in which first segment 77 extends circumferentially and lies in a plane that is normal to the central axis of the valve. At its ends, the first segment is intersected by a second segment 78 and a third segment 79. The second and third segments extend away from the first segment on the same side thereof, and lie approximately parallel to the central axis of the valve. They intersect the circular part of shoulder 47.

Shoulder 68 on the spool is "notched" in two diametrically opposite places as shown in Figs. 3 and 6 by passing a surface grinder across the edge of shoulder 68, while holding the axis of the grinding wheel in a plane parallel to the axis of the spool. This creates two "notches" hereinafter called "hollows" 80, whose characteristics (see Fig. 1) include a first segment 81 which extends circumferentially around a portion of the spool, preferably although not necessarily, in a plane normal to the central axis of the spool. The first segment is intersected at its ends by a second segment 82 and a third segment 83 which extend away from the first segment on the same side thereof, to make an intersection with the generally circular portion of spool shoulder 68.

As best shown in Fig. 3, the bottom of this groove will conventionally be made flat. The depression and the hollow preferably subtend equal dihedral angles, measured from the central axis of the valve. As best shown in Fig. 3, there are two sets of depressions and hollows associated with shoulders 67 and 68, the respective sets being 180° apart, so that with the spool in the rotational adjustment shown in Fig. 3, the depressions and hollows can be exactly aligned. It is also possible to turn the spool in the sleeve so that the area of overlap of depressions and hollows for a given axial displacement in the sleeve is lessened, and may finally be eliminated altogether, if desired.

Shoulder 46 on motor supply groove 42 and shoulder 67 on the spool are provided with three sets of depressions and hollows, instead of two sets. Each set is disposed 120° from the other. All of the depressions and hollows on these and the other "notched" shoulders have like segments, and subtend substantially the same dihedral angle subtent as the depressions and hollows associated with shoulders 67 and 68.

Shoulder 52a on motor supply groove 52 and shoulder 70 on the spool are provided with three sets of depressions and hollows, the same as, and preferably aligned with the depressions and hollows on shoulders 46 and 67.

The outer housing of the tracer valve is provided with a pressure inlet 90 that connects with pressure groove 39. There are two motor supply ports 91, 92 making respective connections with motor supply grooves 42 and 43, and a third motor supply port 93 making fluid connection with motor supply groove 52. Exhaust ports 94, 95 and 96 make respective connections with exhaust grooves 53, 48 and 49.

At the upper end of the valve there are disposed means for rotating the spool relative to the sleeve. A cap 97 is attached to the outer body 36 of the tracer valve. The cap has an opening 98 with a circumferential groove 99 therein. A rotatable dial 100 has an exterior flange 101 which fits in the groove 99, so that the dial can be turned. The dial is provided with a pointer 102.

The dial has an interior passage 103 with a circumferential interior shoulder 104 therein. An assembly spring 105 fits between shoulder 104 and the top of the spool and a counterweight spring 106 rests on top of the shoulder 104 and bears against the underside of an adjustment nut 107 that is threaded onto a stud 108. The stud is threaded into the upper end of the spool, and extends through passage 103.

A tang 109 depends from the dial and projects into a slot 110. When the dial is turned, the spool is rotated relative to the sleeve regardless of the elevation of the spool relative to the sleeve.

A reservoir 111 provides a source and sump for hydraulic fluid in this system. Fluid is withdrawn from the reservoir and pressurized by pump 112, by which it is supplied through conduit 113 to pressure inlet 90. An exhaust conduit 114 discharges into the reservoir, and receives fluid from three branch conduits 115, 116, 117, which are respectively connected to exhaust ports 94, 95 and 96, respectively.

A first motor supply conduit 119 interconnects the lower (biased) part (14a) of cylinder 14 to motor supply port 92. A second motor supply conduit 120 connects with the unbiased upper part (14b) of cylinder 14 with two branches 121 and 122. Branch 121 connects to motor supply port 91, while branch 122 connects to motor supply port 93. A shut-off valve 123 is connected in conduit 122.

In Fig. 4 there is disclosed a machine tool application in which a bias force is exerted by means other than the dead weight of part of the machine tool itself. Fig. 4 illustrates a lathe tracer of the type wherein a tracer valve 125 has a stylus 126 which is adapted to trace along the edge of template 127. The tracer valve is mounted on a pedestal 128. The pedestal is on a cross-slide 129.

A cutting tool 130 is mounted by a tool holder 131 to the cross-slide, so that the cutting tool is applied to a rotating workpiece 132. The workpiece and the template are mounted to connecting structure, so that they retain their relative spatial positions. The cross-slide is mounted on a carriage 133 so it is movable transversely relative to the axis of movement of the carriage in accordance with known lathe constructions.

A fluid motor 134 is mounted to the carriage and connected by rod 135 or other engagement means to the cross-slide. This fluid motor may conveniently be of the meshed-gear type.

A bias cylinder 136 has a piston 137 therein. It receives fluid pressure at its left-hand side from a hydraulic accumulator 138 which accumulator is fed by a pump 139 or other source of pressurized fluid. There is a valve 140 between the pump and the accumulator.

The bias cylinder and piston combination, through a rod 137a attached to the cross-slide and the piston, biases the cross-slide against the fluid motor and takes out the backlash from the gear system. The fluid motor will therefore work against the bias cylinder when it moves the cross-slide to the left in Fig. 4, and will be aided by it when it moves the cross-slide to the right in Fig. 4. The "biased" side of the motor is the side on which the additional work must be done to overcome the bias force.

Tracer valve 125 has the same characteristics as tracer valve 23 in Fig. 1, with the motor supply groove having the more numerous depressions and hollows adjacent thereto being connected to the unbiased side of the fluid motor.

In Fig. 5 there is shown another embodiment of "notches" useful in the device of this invention. This particular shoulder illustrates a different type of hollow for the spool. If preferred, the different construction might be applied to the depression in the sleeve. It could be, but ordinarily will not be applied to both.

In Fig. 5 there is illustrated an outer housing 150 with an interior sleeve 151 that has an axial spool passage 152 therethrough. A motor supply groove 153 is provided which has a pair of broached depressions 154, 155 intersecting with it. If desired, a conduit 156 can be connected directly with one or both of the broached depressions to provide fluid communication to the motor supply groove.

The way in which the embodiment of Fig. 5 differs from the hollow shown in the valve of Fig. 1 resides in the configuration of the first segment 157 on shoulder 158 of spool 159. This first segment, instead of lying in a plane normal to the central axis 160 of the spool valve, lies canted at an angle thereto, and also nonparallel to said axis. A second segment 161 and a third segment 162 intersect the first segment. The adjacent groove 163 on the spool connects with exhaust conduit 164. It will be observed that on sliding movement of the spool within the sleeve, the first segment makes a more gradual registration with the corresponding first segment on the broached depression than the first segment shown in Fig. 1, the rotationally aligned portions of which register all at once. For purposes of illustration, the spool in Fig. 5 is shown rotated so that the hollows are 90° out of phase with the depressions. Under these circumstances, the depressions and hollows will not register. Turned 90° from the position illustrated, they would register when in a relative axial position in which the first segments can overlap.

It will be observed that the valve of Fig. 1 is in neutral position, and with the depressions and hollows rotationally aligned. Therefore, when the spool is axially shifted in the sleeve without further rotation of the spool therein, a gradual opening at a low rate will begin through the flow orifices past the overlapping first segments. Upon a sufficient axial displacement of the spool, then the full circular segments of the appropriate shoulders will pass into registration, and a very large flow orifice will be obtained after the initial slow opening. It will be recognized that the initial small orifice provided by the overlapping between the depressions and hollows is a function both of axial displacement of the spool relative to the sleeve and of its rotational orientation therein. The flow orifice controlled by the depression and the hollows will occur when they are in full rotational correspondence and the minimum (or even a no-flow condition) will occur when they are out of it.

In Fig. 7 there is shown a "stepped" hollow 200 in a shoulder 201 of an exhaust groove 202 on a valve spool 203. This spool may be substituted for the spool in Fig. 1, only the hollows being different. Hollow 200 has a plurality of first segments 204, 205, 206 which are radially staggered and axially spaced from each other. This spool gives a step-wise flow pattern. The mating depression may simply be rectangular as in Fig. 1. It will be observed that first segments 204 and 205 terminate at axially-extending segments which extend in opposite directions from the first segments. The extreme first segments 204 and 206 have their opposite ends terminated by segments which join the shoulder 201.

The operation of the device shown will now be described. The unit is shown in its neutral position in Fig. 1, at which time the stylus tip 28 bears against the template 18, and the worktable has moved up so that the stylus pushes straight up on the spool to hold it at a centralized or "neutral" position. This appropriately positions the cutting tool which through its motor is attached to the same structure as the tracer valve. In the event that after movement along the X axis, a recessed portion of the template arrives at the stylus, the stylus will drop into it. Then the spool will move down so that pressure is applied at pressure inlet 90, through pressure groove 55, past edge 57, and into motor supply groove 43, from which it flows through conduit 119 to part 14a of the knee cylinder. It will be noted that this flow is past an unnotched and unmodified pair of shoulders which open fully as soon as the valve spool has shifted.

As piston 15 moves upward, fluid is expelled through conduit 120, where it enters port 91 and, if valve 123 is open, also through port 93. Assume for a moment that valve 123 is closed and that all of the flow passes into port 91. Then the fluid flows solely into motor supply groove 42, and past the aligned, overlapped depressions and hollows in edges 46 and 67, into exhaust groove 60 from which it passes out port 95, and thence through conduit 114 back to reservoir. It will be observed that this flow occurs from the unbiased side of the cylinder and flows past "notched" shoulders, and that these are the notched shoulders which have the greatest number of notches on them.

The greater flow area adjacent to one groove than to the other is dictated by the fact that the pressure in conduit 119 is greater when it is exhausting fluid than the pressure in conduit 120 when it is exhausting fluid. The reason for the difference in pressure is to be found in the bias tendency. The weight of the knee, for example, adds an increment of pressure to chamber 14a that it does not add in chamber 14b. Because of the greater pressure in conduit 119 than in conduit 120 at analogous conditions, a given volume of flow in conduit 119 at the higher pressure will pass through a smaller orifice, while the same amount of flow at the lower pressure in conduit 120 requires a larger orifice. That is why shoulder 67 has more notches than shoulder 68.

As soon as the stylus strikes a rising shoulder or rising surface on the template, it is desired for the table to drop and this will occur whenever the stylus is tilted or raised so as to raise the spool in the sleeve. At that time, pressure from pressure groove 55 passes unnotched shoulders 44 and 56 into motor supply groove 42 from which it flows through conduit 120 to the part 14b of the knee cylinder. This causes the knee cylinder to drop, and the table is lowered. The piston expels fluid through conduit 119, which fluid enters port 92 and motor supply groove 43. The fluid from groove 43 flows past edges 47 and 68 through the aligned depressions and hollows. It will be observed that this is on the biased (higher pressure) side of the motor, and that fewer notches are required to pass this fluid under higher pressure than when the movement occurred in the opposite direction, in which fluid was expelled from the motor under lower pressure.

The reason for having a greater number of notches rather than merely wider notches is that it is desirable that all notches in this system have the same dihedral angle subtent from the central axis of the valve. This enables all of the notches to be "synchronized" rotationally, so that the radial adjustment of all notches is identical. Then axial movement of the spool opens each notch by an identical amount.

The reason that the extra motor supply groove 52 is provided at the top of the valve on the unbiased side is that the maximum amount of notching possible around these shoulders is one-half of the periphery, for otherwise the valve could not be closed off. Under many operating conditions, it has been found that the flow orifice needed is so large that the spool valve would have to have too great a diameter. Therefore, more peripheral shoulder length is provided by placing a second valve in parallel with the first valve.

If further details of the operation of the tool of this type are desired, they may be obtained by referring to applicant's said co-pending patent application, Serial No. 748,426.

The first segments of the depressions and hollows shown in Fig. 1 make a sudden registration when laterally aligned. It is occasionally found undesirable to have a sudden application of power even at a slow rate and the first segment 157 shown in Fig. 5 may be used when a more gradual initial registration is desired.

The operation of the tool of Fig. 4 is the same as that of Fig. 1, except that the spool will be spring-loaded toward the template so as to tend to make contact therewith and bias the stylus toward the template, and, concurrently, the cutting tool toward the workpiece. Apart from that situation, the operation of the device of Fig. 4 is identical to that of Fig. 1.

It will be observed that the notched shoulders are all provided on the exhaust side of the system. This enables the pressure side to be turned substantially "full-on" when the stylus is moved from its neutral position. Control is exerted on the exhaust side of the system, an arrangement which has been found to be more desirable than attempting to control the pressure side.

This invention provides a convenient means for controlling a machine tool which has a biased tendency. It also provides a means whereby the rate of operation of a machine tool can be made uniform in both directions along an axis and can, by the mere expedient of turning the spool in a sleeve, have its rate adjusted from very low rates to very high rates without the complications introduced in attempting to reach these goals in prior art devices.

In addition, this device provides a means whereby the initial control rate for small movements may be very closely controlled, and wherein, when large rapid movements are desired, the stylus may simply be deflected farther, after which the remainder of the circular shoulders overlap so as to provide a large flow orifice for fast movement, until the machine again is in such a relationship to the template that small closely controlled movements are again desired.

This invention is not to be limited by the embodiments shown in the drawing and described in the description which are given by way of example and not of limitation, but only in accordance with the scope of the appended claims.

I claim:

1. A valve adapted to make contact with a pattern for controlling movement of a portion of a machine tool, which portion is reciprocable in both directions along a machine axis, and has a biased tendency to move in one of said directions, the portion being movable by a motor having a biased and unbiased side, the biased side being that side on which force must be exerted to overcome the biased tendency, said valve comprising: a sleeve member; an interior wall in said sleeve member which defines a substantially circular cylindrical spool passage having a valve axis, a pressure inlet port, a pair of motor supply ports, and a pair of exhaust ports opening through said wall into said spool passage, said ports being axially spaced apart from each other, a circular cylindrical spool member slidably and rotatably disposed in said spool passage, said spool member having a central pressure groove adapted to connect one or the other of said motor supply ports to the pressure inlet port upon axial shifting of the spool in the passage, and an exhaust groove on each side of the pressure groove adapted to simultaneously connect the remaining motor supply port to one of the exhaust ports, said motor supply ports being adapted for connection to a motor, the side of each exhaust groove closest to the pressure groove incorporating a hollow, and the side of the motor supply ports farthest from the pressure inlet port incorporating a depression, each hollow and each depression including a first segment extending non-parallel to the valve axis, and a second and third segment intersecting the first segment and departing therefrom on the same side thereof, all hollows and depressions being adapted for simultaneous alignment, the overlap of depressions and hollows being a function of both the axial and rotational position of the spool in the sleeve, there being a greater number of depressions and hollows in communication with the unbiased side of said motor than with the biased side thereof.

2. Apparatus according to claim 1 in which all first segments subtend equal dihedral angles around the valve axis.

3. Apparatus according to claim 1 in which the sleeve incorporates an additional motor supply port and an additional exhaust groove, which include depressions and hollows, respectively, in parallel connection with the motor supply port connected to the unbiased side of the motor.

4. Apparatus according to claim 1 in which the motor supply ports include circumferential grooves, the depressions extending axially from said grooves, and in which the hollows extend axially from the exhaust grooves, whereby, upon sufficient movement of the spool in the sleeve, the said grooves overlap for quick traverse movement as a result of a large-area overlap of the grooves.

5. In a control valve having a sleeve having an axis and a spool rotatably and slideably disposed in said sleeve, said sleeve and spool having recesses therein, said recesses including first, second and third edge segments, the first segment of one of the recesses lying canted relative to the axis, and the second and third segments extending axially away therefrom on the same side thereof, the first segment of the other recess lying in a plane normal to the axis, the second and third segment extending axially away therefrom on the same side thereof.

6. A valve adapted to make contact with a pattern for controlling movement of a portion of a machine tool, which portion is reciprocable in both directions along a machine axis, and has a biased tendency to move in one of said directions, the portion being movable by a motor having a biased and unbiased side, the biased side being that side on which force must be exerted to overcome the biased tendency, said valve comprising: a sleeve member; an interior wall in said sleeve member which defines a substantially circular cylindrical spool passage having a valve axis, a pressure inlet port, a pair of motor supply ports, a pair of circumferential motor supply grooves, each extending completely around the valve axis and connecting with a respective one of said motor supply ports, and a pair of exhaust ports opening through said wall into said spool passage, said ports being axially spaced apart from each other, a circular cylindrical spool member slidably and rotatably disposed in said spool passage, said spool member having a central pressure groove adapted to connect one or the other of said motor supply ports to the pressure inlet port upon axial shifting of the spool in the passage, and a circumferential exhaust groove extending completely around the spool on each side of the pressure groove adapted to simultaneously connect the remaining motor supply port to one of the exhaust ports, said motor supply ports being adapted for connection to a motor, the side of each exhaust groove closest to the pressure groove incorporating a hollow, and the side of the motor supply grooves farthest from the pressure inlet port incorporating a depression, each hollow including a first segment extending non-parallel to the valve axis, and a second and third segment intersecting the first segment and departing therefrom on the same side thereof, the depression including a plurality of first segments which lie in planes normal to the valve axis, and which are axially and radially staggered from each other, a second and third segment extending from opposite ends of radially extreme first segments to connect the first segments to the exhaust grooves, the overlap of depressions and hollows being a function of both the axial and rotational position of the spool in the sleeve.

7. Apparatus according to claim 1 in which the exhaust grooves extend circumferentially completely around the spool, and in which motor supply grooves are formed in the wall of the spool passage which connect to the motor supply ports, said motor supply grooves extending completely around the valve axis, the depressions being formed in an edge of the motor supply grooves, the hollows, depressions, exhaust grooves, and motor supply grooves being so proportioned and arranged that, with the first segments at least partially radially overlapped, one pair of depressions and hollows gradually increases in registration as the spool is shifted in the sleeve from a centralized position, and thereafter the respective exhaust groove and motor supply groove directly register.

References Cited in the file of this patent

UNITED STATES PATENTS

| | | |
|---|---|---|
| 2,641,969 | Roehm | June 16, 1953 |
| 2,741,952 | Roehm | Apr. 17, 1956 |
| 2,835,466 | Rosebrook | May 20, 1958 |
| 2,841,356 | Glaser | July 1, 1958 |

UNITED STATES PATENT OFFICE
CERTIFICATION OF CORRECTION

Patent No. 2,971,535            February 14, 1961

Paul J. Weaver

It is hereby certified that error appears in the above numbered patent requiring correction and that the said Letters Patent should read as corrected below.

Column 5, lines 12 and 13, for "sleeve lands. Both the spool passage" read -- spool passage. Both the sleeve lands --.

Signed and sealed this 3rd day of April 1962.

(SEAL)
Attest:

ERNEST W. SWIDER
Attesting Officer

DAVID L. LADD
Commissioner of Patents